Dec. 18, 1951  M. W. KREMER  2,579,117
APPARATUS FOR MAKING SECTIONAL WIRES
Filed Aug. 27, 1946
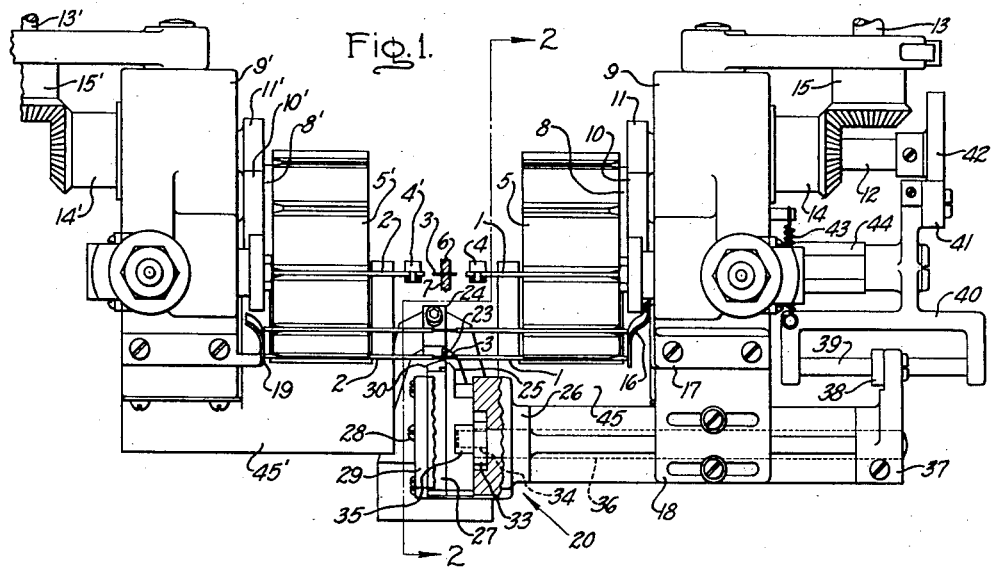
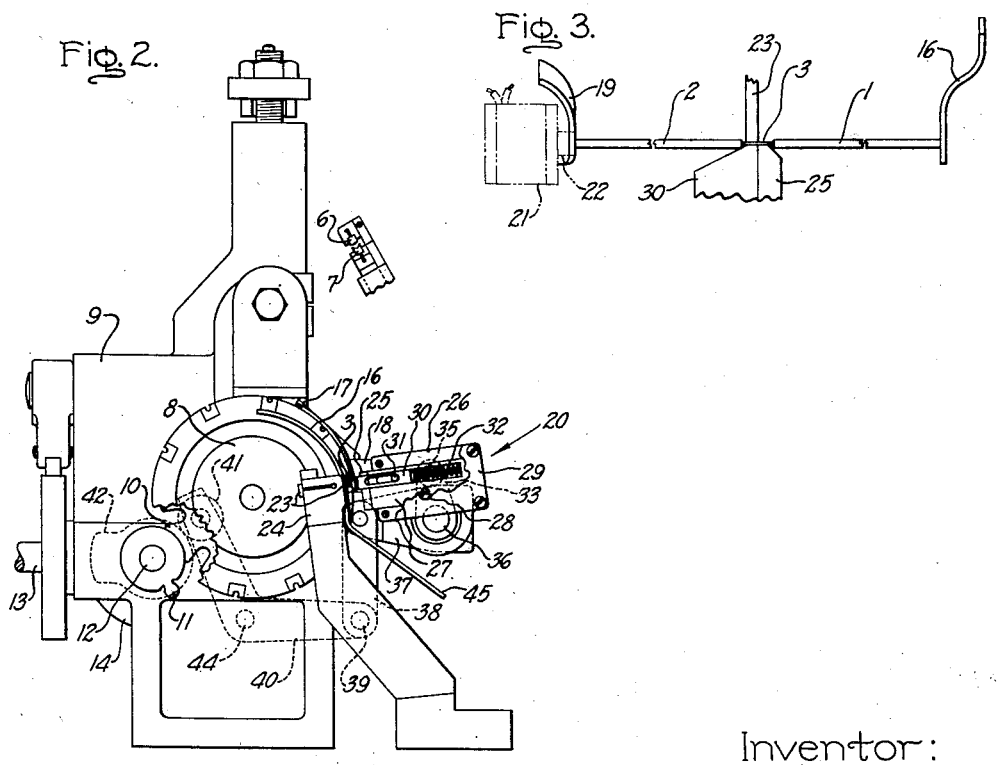
Inventor:
Merle W. Kremer,
by John J Henderson
His Attorney.

Patented Dec. 18, 1951

2,579,117

UNITED STATES PATENT OFFICE 2,579,117

APPARATUS FOR MAKING SECTIONAL WIRES

Merle W. Kremer, Euclid, Ohio, assignor to General Electric Company, a corporation of New York Application August 27, 1946, Serial No. 693,174

4 Claims. (Cl. 140—112)

My invention relates to an apparatus for making composite or sectional wires and more particularly relates to the making of a sectional wire of two welded sections of different composition. Wires of this kind are used in radio tubes, discharge tubes, lamps and other electrical devices where the composition of the wire must have particular properties corresponding to the portion of the electrical device in which it is located. For instance, one two-section wire used as a support wire in radio tubes must have one section of nickel to function properly in the interior of the tube and the second section of a copper-clad steel known as Dumet to seal to the glass tube part in which it is embedded.

One object of my invention is to provide an apparatus for making accurate and straight sectional wires automatically at higher speed and more economically than heretofore. To realize this object, I first weld together three lengths of wire to form a three-section wire, preferably as disclosed in United States Letters Patent 2,034,560, Bumstead, and then cut the intermediate section of said wire so that two two-section wires are formed. The three-section wire can be cut exactly in the center so that two duplicate two-section wires are formed at the same time or can be cut at some other point so that two differently proportioned two-section wires are formed. The three-section wire can also be made with end sections of wire of different size or composition so that it is possible to make two two-section wires of almost any construction at the same time according to my invention.

Another object of my invention is to provide an apparatus for making automatically accurate and straight two-section wires having one section of very short length. Heretofore, the shortness of one section of the sectional wire was limited to that length which it was practical to hold in the welding apparatus whereas said section can be one half that length if the three-section wire is divided at the mid-point or even shorter if said three-section wire is divided off center according to my invention. Also according to my invention a two-section wire having one section longer than desired can be made first and then one of said sections can be cut or trimmed to a length shorter than can be provided in the first instance.

Other objects and advantages of my invention will appear in detailed description which follows of the species thereof shown in the drawing.

In the drawing, Fig. 1 is a plan view of the essential apparatus for welding lengths of wire together to form a sectional wire and thereafter cutting said sectional wire to the proper proportions; Fig. 2 is a side elevation of a portion of the apparatus taken from dash-dot line 2—2 of Fig. 1 in the direction indicated; and Fig. 3 is a diagrammatic view on a larger scale of a three-section wire being cut into two two-section wires.

As shown in the drawing, the method is initiated by the formation of a three-section wire in welding apparatus like that disclosed in detail in United States Letters Patent 2,034,560, owned by the assignee of the present invention. The sectional wire is formed of two relatively long lengths 1 and 2 of nickel wire which are joined by welding to a relatively short intermediate length 3 of copper-clad steel wire known as Dumet and is made by a succession of operations which cause the arm 4 to move the wire length 1 longitudinally in the groove in drum 5 until its end engages and welds to the intermediate wire length 3 and which then cause arm 4' to move wire length 2 longitudinally in the drum 5' until it engages and welds to the intermediate wire length 3. During the welding operation the intermediate wire length 3 is held in position by the jaws 6 and 7 of transferring mechanism (not shown) which move away from said length 3 after said operation. The arms 4 and 4' also release the wire lengths 1 and 2 at such times so that the then complete three-section wire is supported entirely by the drums 5 and 5'.

Succeeding operations of the apparatus cause the drums 5 and 5' which are mounted on aligned means 8 and 8' supported by the standards 9 and 9' to index and advance the sectional wire from the welding station and adjacent grooves therein to said station. The indexing operation is brought about in each instance, one instance being indicated by corresponding primed numbers, by the Geneva gear wheel 10 which is fastened to drum 5 and which is engaged by the Geneva gear 11 on the driven shaft 12 journalled in standard 9. The driven shaft 12 is turned, in turn, from one of the main drive shafts 13 of the apparatus through the bevel gears 14 and 15.

A second indexing movement of the drums 5 and 5' carries one end of the sectional wire against the spring finger 16 (Figs. 1 and 3) which is mounted through arm 17 and plate 18 on the standard 9 and which repositions said wire longitudinally until its opposite end butts against the stop plate 19. The spring finger 16 and the stop plate 19 which is directly attached to standard 9' are positioned adjacent the outer faces of the drums 5 and 5' so that the sectional wire is definitely positioned in the apparatus and with relation to the shearing mechanism 20. In certain other instances, other positioning means can be used such as the magnetic means shown in dot-dot-dash lines in Fig. 3 which means provides a solenoid 21 periodically energized through actuation of a switch (not shown) by the main drive means. In such instances, the wire length 2 must be of a material having magnetic properties and the magnetic attraction produced by the solenoid 21 draws the end of said length 2 against the core 22 thereof which functions as a stop and positions the sectional wire.

The shearing mechanism 20, in this particular instance, is arranged so as to cut the intermediate wire length 3 of the sectional wire at the midpoint so that both halves of the sectional wire form a two-section wire of exactly the same proportions. The sectional wire is cut between the cooperating edges of the stationary clamping block 23 which is mounted in a groove in the bracket 24 and the knife 25 which slides within ways in the stationary bracket 26 attached to standard 9 by plate 18. The knife 25 is located in the ways of bracket 26 below an insert block 27 (Fig. 2) which in turn is held in place by a screw 28 and the cover plate 29 and in the course of advancing toward the sectional wire allows the sliding clamping block 30 to which it is connected by pin 31 to move similarly in the corresponding ways in the insert block 27. The sliding clamping block 30 which extends beyond the end of the knife 25 engages the sectional wire prior thereto and serves to hold said wire tightly against the stationary clamping block 23 during the cutting of said wire and the later withdrawal of the knife 25. When the sliding clamping block 30 engages the sectional wire the further movement of the knife 25 carries the pin 31 forward in a slot in said block 30 and the expansion force of the spring 32 which is located between the end of said block 30 and a portion of the insert block 27 keeps said block 30 pressed tightly against the sectional wire. The movement of the knife 25 which is little more than sufficient to cut the sectional wire is terminated by the operating means therefor which comprises the arm 33 engaging through pin 34 and roller 35 a cross notch in said knife 25, shaft 36, arm 37, link 38, pin 39, lever 40, roller 41, and cam 42. The contracting force of a spring 43 located between posts extending from lever 40 and the standard 9 causes the lever 40 to be turned about a post 44 extending from the standard 9 so that the roller 41 is kept against the cam 42 and the knife 25 is moved in accordance with the form thereof. Because of the high speed of operation of the apparatus the cam 42 which is mounted on an extending portion of the driven shaft 12 is almost immediately turned so that the knife 25 and then the sliding clamping block 30 are withdrawn from contact with the sectional wire. The succeeding indexing movement of the drums 5 and 5' carries the ends of the sectional wires against the plates 45 and 45' respectively which force said wires from the grooves in the drums 5 and 5' so that they then fall free of the apparatus.

In the described instance the shearing mechanism 20 is arranged to cut the intermediate wire section 3 exactly at the center so that two exactly duplicate two-section wires are formed by the apparatus. In certain other instances it is desirable to make a like number of otherwise proportioned two-section wires whereupon the apparatus is adjusted to make differently proportioned three-section wires and the shearing mechanism 20 is adjusted to cut at another point along the intermediate section 3 of the three-section wires. The adjustment to the cutting mechanism 20 is made by moving the bracket 24 on the table (not shown) on which it is mounted to bring the stationary clamping block 23 to the required position and then loosening the bracket 26 from plate 18 and moving said bracket 26 and the knife 25 correspondingly. During the latter adjustment the link 38 of the operating means for the knife 25 slides along pin 39.

What I claim as new and desire to secure by Letters Patent of the United States is:

1. In welding apparatus for making sectional wires, a pair of rotatable drums on a common axis having a plurality of grooves in the periphery thereof each adapted to support a length of wire, means for positioning and welding in end-to-end relation lengths of wire in aligned grooves in the respective drums and a third wire interposed therebetween to form a three-piece sectional wire, means for indexing the drums correspondingly to advance the grooves supporting the sectional wire to a second position, means located adjacent the outer faces of respective drums at the second position taken by the aforementioned grooves for repositioning the sectional wire longitudinally within said grooves to cause said wire to be definitely positioned, shearing means located at the second position and arranged to cut the sectional wire at a point intermediate the ends of said third wire while held in said drums, and means for operating said several means in proper time relation.

2. A welding machine comprising the combination of means for supporting and welding three wires in end-to-end relation to form a composite wire, shearing means mounted on said welding machine and constructed and arranged to sever the middle section of said composite wire at a point intermediate its ends, said supporting means including transfer means for carrying the composite wire from said welding means into operative relation to said shearing means and for supporting the end sections of the composite wire during both the welding and shearing operations, means located adjacent the path of movement of said transfer means and adjacent said shearing means for engaging the composite wire in said transfer means to position said wire therein accurately with respect to said shearing means, and means for actuating said several means in proper time relation.

3. A welding machine comprising the combination of means for supporting and welding three wires in end-to-end relation to form a composite wire, shearing means mounted on said welding machine and constructed and arranged to sever the middle section of said composite wire at a point intermediate its ends, said supporting means including transfer means for carrying the composite wire from said welding means into operative relation to said shearing means and for supporting the end sections of the composite wire during both the welding and shearing operations, means located adjacent the path of movement of said transfer means and adjacent said shearing means for engaging the composite wire in said transfer means to position said wire therein accurately with respect to said shearing means, the last-mentioned means comprising a stop member and a spring finger located at opposite sides of said path of movement of said transfer means, said spring finger being arranged to engage one end of the composite wire and press the other end thereof against said stop member, and means for actuating said several means in proper time relation.

4. A welding machine comprising the combination of means for supporting and welding three wires in end-to-end relation to form a composite wire, shearing means mounted on said welding machine and constructed and arranged to sever the middle section of said composite wire at a point intermediate its ends, said supporting means including transfer means for carrying the composite wire from said welding means into operative relation to said shearing means and for supporting the end sections of the composite wire during both the welding and shearing operations, means located adjacent the path of movement of said transfer means and adjacent said shearing means for engaging the composite wire in said transfer means to position said wire therein accurately with respect to said shearing means, the last-mentioned means comprising a stop member and a solenoid located adjacent thereto to attract one end of the composite wire into engagement with said stop, and means for actuating said several means in proper time relation.

MERLE W. KREMER.

REFERENCES CITED

The following references are of record in the file of this patent:

UNITED STATES PATENTS

| Number | Name | Date |
|---|---|---|
| 281,961 | Berry | July 24, 1883 |
| 669,610 | Wurts et al. | Mar. 12, 1901 |
| 1,470,413 | Wilcox | Oct. 9, 1923 |
| 1,478,683 | Stevens | Dec. 25, 1923 |
| 1,605,535 | Foisy | Nov. 2, 1926 |
| 1,842,631 | Rolle | Jan. 26, 1932 |
| 2,034,560 | Bumstead | Mar. 17, 1936 |
| 2,111,426 | Hilbert | Mar. 15, 1938 |
| 2,135,288 | Koenig | Nov. 1, 1938 |
| 2,244,554 | Hannaford | June 3, 1941 |